(12) United States Patent
Wang

(10) Patent No.: US 8,950,930 B2
(45) Date of Patent: Feb. 10, 2015

(54) STIRRING BLADE GROUP STRUCTURE AND STIRRING DEVICE USING THE SAME

(75) Inventor: Wenxiong Wang, Shenzhen (CN)

(73) Assignee: Wenxiong Wang, Shenzhen (CN)

( * ) Notice: Subject to any disclaimer, the term of this patent is extended or adjusted under 35 U.S.C. 154(b) by 0 days.

(21) Appl. No.: 13/470,999

(22) Filed: May 14, 2012

(65) Prior Publication Data

US 2012/0314533 A1  Dec. 13, 2012

(30) Foreign Application Priority Data

Nov. 13, 2009  (CN) .......................... 2009 1 0222714
Dec. 8, 2009  (WO) ................ PCT/CN2009/075338

(51) Int. Cl.
*B01F 7/00* (2006.01)
*A47J 43/046* (2006.01)
*B01F 7/16* (2006.01)
*B01F 15/00* (2006.01)

(52) U.S. Cl.
CPC .............. *A47J 43/046* (2013.01); *A47J 43/058* (2013.01); *B01F 7/162* (2013.01); *B01F 7/0015* (2013.01); *B01F 7/00275* (2013.01); *B01F 7/00616* (2013.01); *B01F 7/00975* (2013.01); *B01F 2015/00623* (2013.01)
USPC ........................................... 366/205; 366/314

(58) Field of Classification Search
CPC ............................. A47J 43/046; A47J 43/085
USPC .......................... 366/205, 297, 334, 257, 314
See application file for complete search history.

(56) References Cited

U.S. PATENT DOCUMENTS

| | | | | |
|---|---|---|---|---|
| 4,911,557 A | * | 3/1990 | Dormer et al. ................. | 366/299 |
| 6,523,993 B2 | * | 2/2003 | Williams et al. ............... | 366/197 |
| 6,981,795 B2 | * | 1/2006 | Nikkah ......................... | 366/205 |
| 2006/0007779 A1 | * | 1/2006 | Fernandez et al. ............. | 366/206 |
| 2008/0198691 A1 | * | 8/2008 | Behar et al. .................... | 366/205 |

* cited by examiner

*Primary Examiner* — Tony G Soohoo
*Assistant Examiner* — Anshu Bhatia
(74) *Attorney, Agent, or Firm* — Alston & Bird LLP

(57) ABSTRACT

A stirring blade group structure comprises a stirring blade base and at least three groups of stirring blades attached to the stirring blade base. Each stirring blade group includes a stirring shaft, a lower stirring blade, and an upper stirring blade. The upper stirring blade and the lower stirring blade cross and are attached to one end of the stirring shaft. The upper stirring blade is U-shaped.

19 Claims, 10 Drawing Sheets

STIRRING BLADE GROUP STRUCTURE AND STIRRING DEVICE USING THE SAME

CROSS-REFERENCE TO RELATED APPLICATION

This application is a continuation-in-part of International Application No. PCT/CN2009/075338, filed on Dec. 8, 2009, which claims the benefit of Chinese Patent Application No. 200910222714.6, filed on Nov. 13, 2009, the contents of which are incorporated herein by reference in their entireties.

TECHNICAL FIELD

Example embodiments of the present disclosure relate generally to a device for mashing and squeezing fruits, vegetables and beans, and more particularly to a stirring blade group structure and a stirring device using the same.

BACKGROUND

Blenders are used to smash and squeeze fruits. A conventional blender may include a single shaft to which a single stirring blade is attached. When the blender operates, food rotates in the same direction as the stirring blade. This may reduce the blender's effect and efficiency. A conventional blender may include a single shaft to which two stirring blades are attached. Such blenders generally have round containers. When such a blender is in operation, planes constituted by the two stirring blades do not meet the shapes of the container, resulting in more dead angles than blenders having a single stirring blade. As a consequence, the stirring effect and efficiency is decreased.

SUMMARY OF THE INVENTION

According to one exemplary embodiment of the present invention, a stirring blade group structure comprises a stirring blade base and at least three groups of stirring blades attached to the stirring blade base. Each stirring blade group includes a stirring shaft, a lower stirring blade, and an upper stirring blade. The upper stirring blade and the lower stirring blade cross and are attached to one end of the stirring shaft. The upper stirring blade is U-shaped.

According to one exemplary embodiment of the invention, a stirring device comprises a drive unit, a transmission assembly coupled to the drive unit and a stirring blade group structure coupled to the transmission assembly. The transmission assembly is configured to transmit power from the drive unit to the stirring blade group structure. The stirring blade group structure includes a stirring blade base and at least three groups of stirring blades attached to the stirring blade base. Each stirring blade group includes a stirring shaft, a lower stirring blade, and an upper stirring blade. The upper stirring blade and the lower stirring blade cross and are attached to one end of the stirring shaft and wherein the upper stirring blade is U-shaped.

BRIEF DESCRIPTION OF THE DRAWINGS

Figure 1:
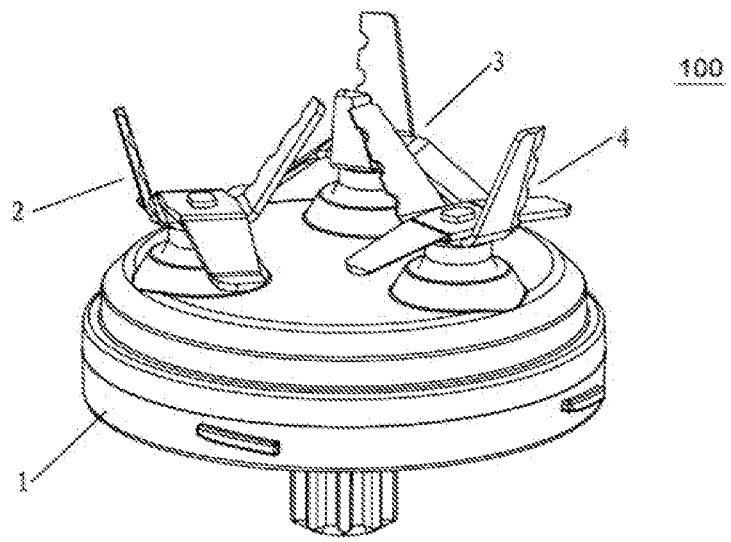
Figure 2:
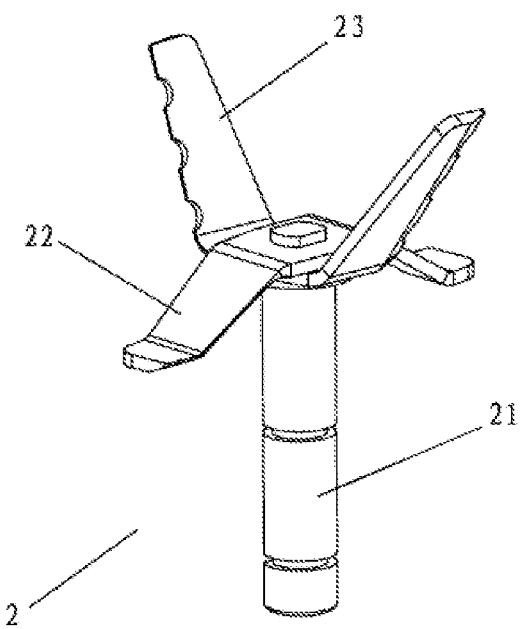
Figure 3:
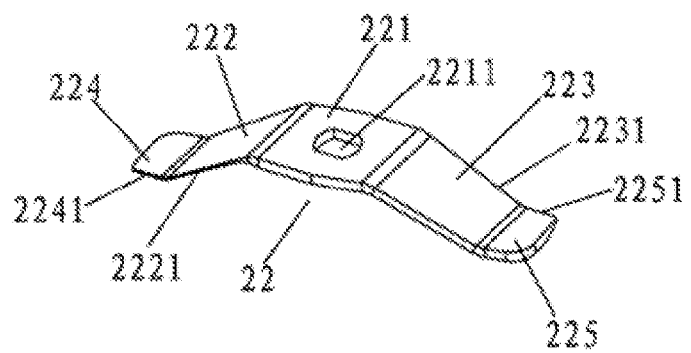
Figure 4:
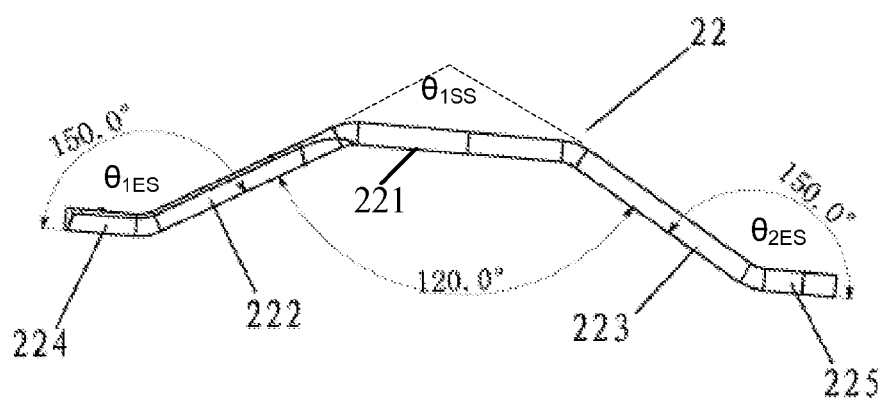
Figure 5:
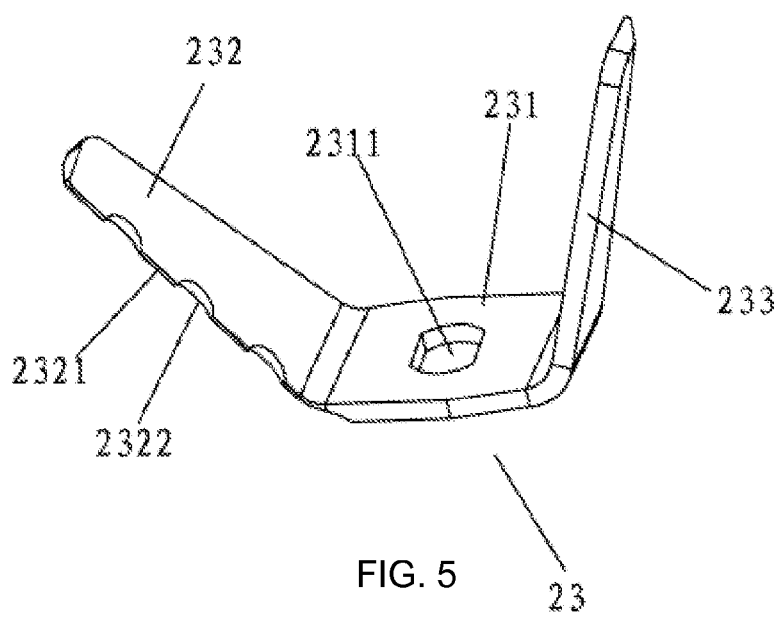
Figure 6:
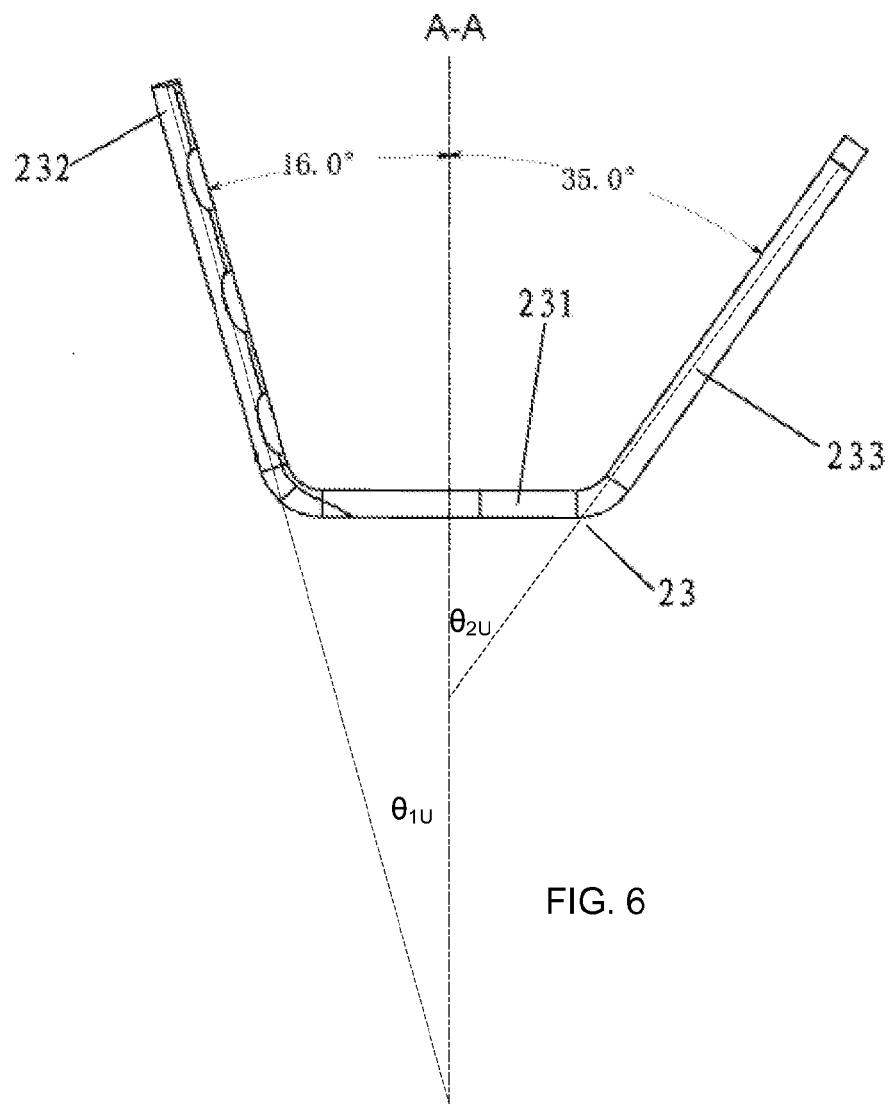
Figure 7:
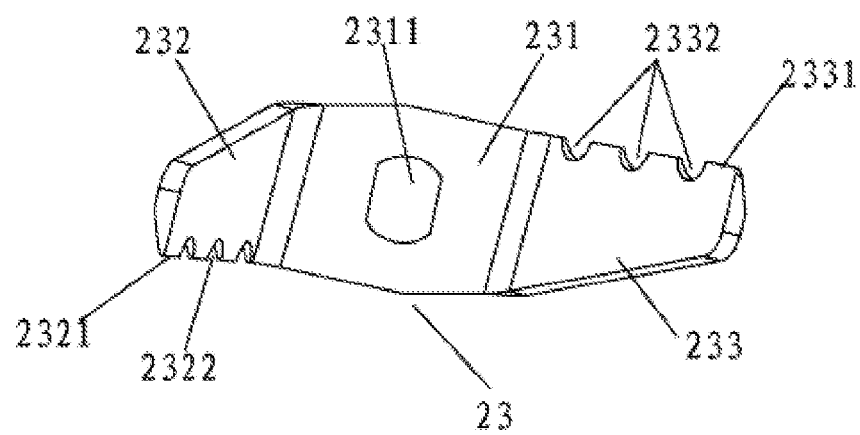
Figure 8:
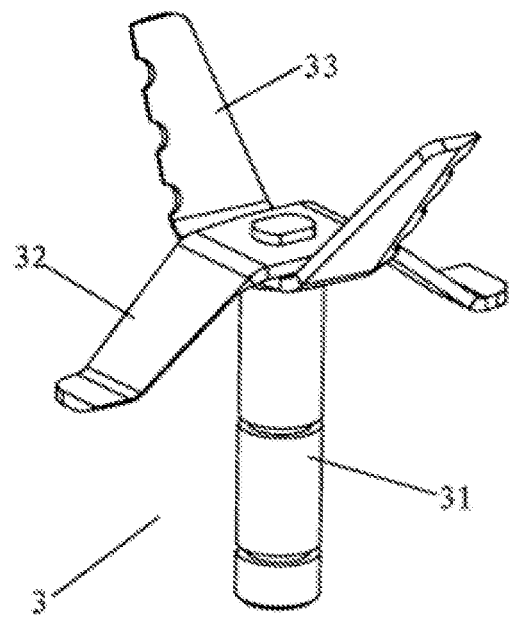
Figure 9:
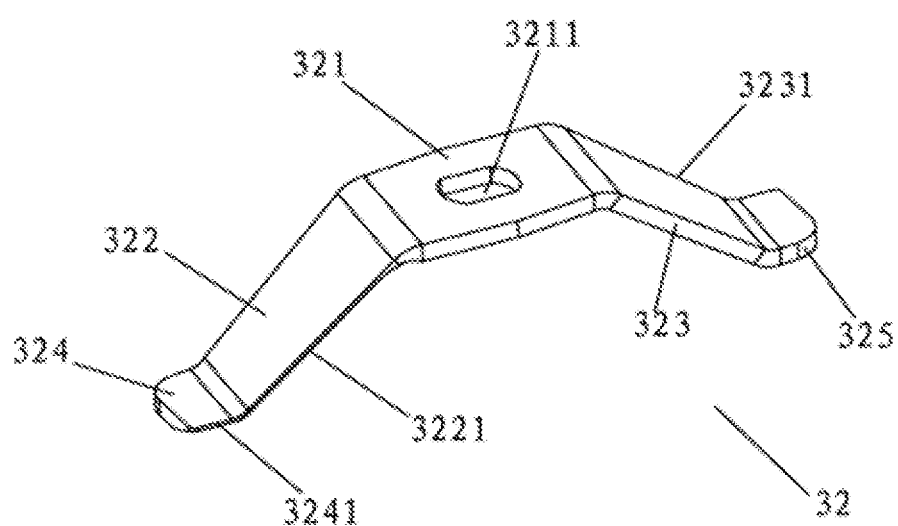
Figure 10:
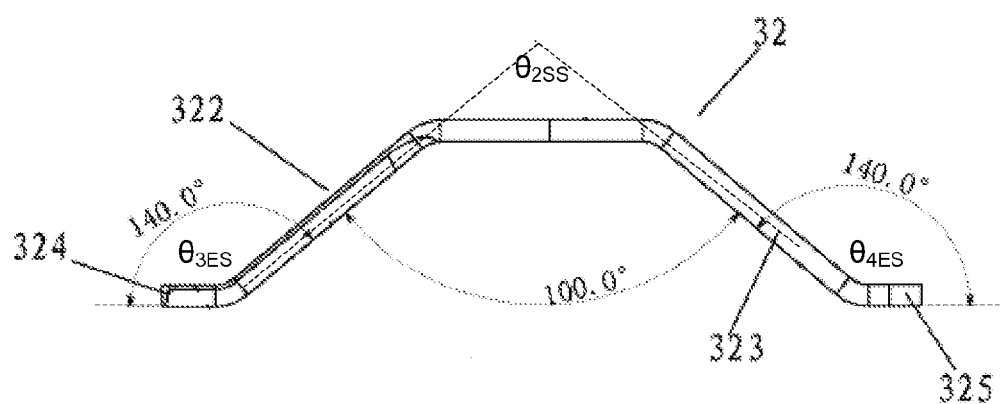
Figure 11:
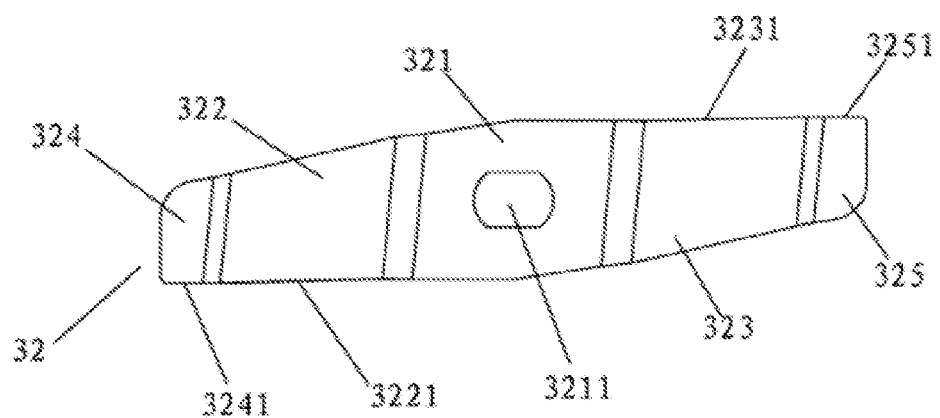
Figure 12:
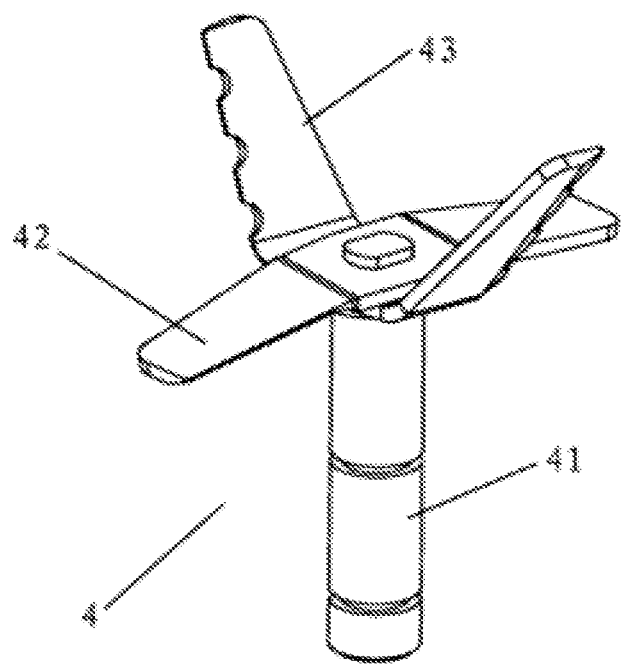
Figure 13:
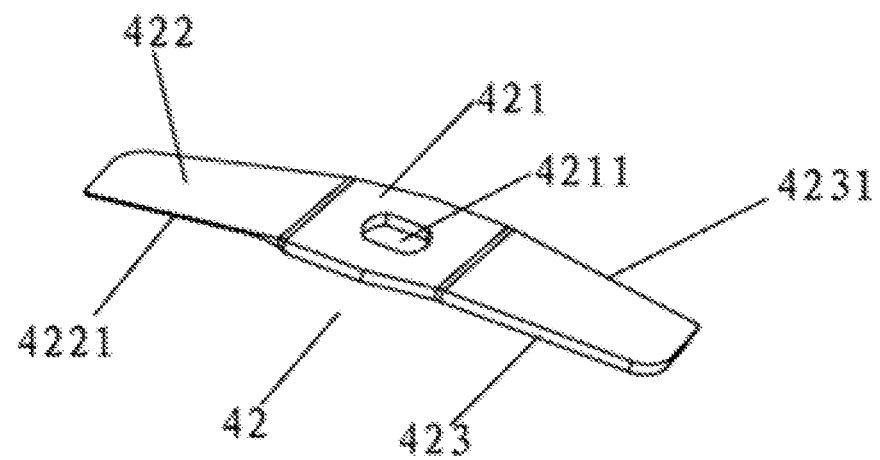
Figure 14:
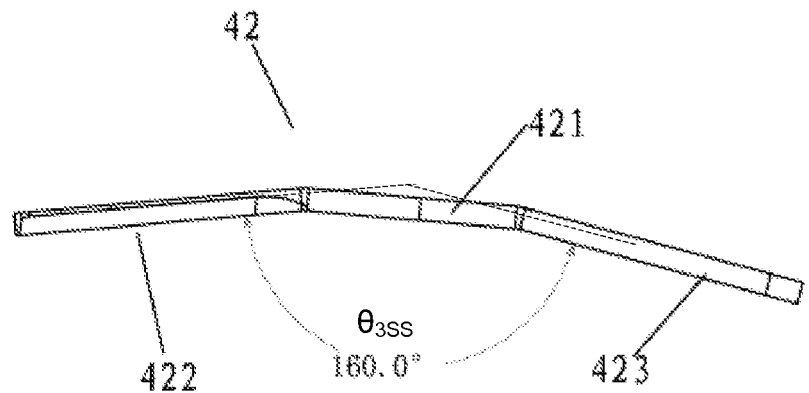
Figure 15:
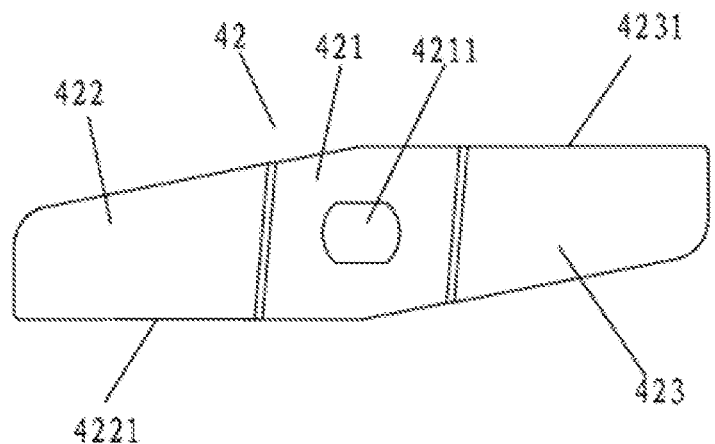
Figure 16:
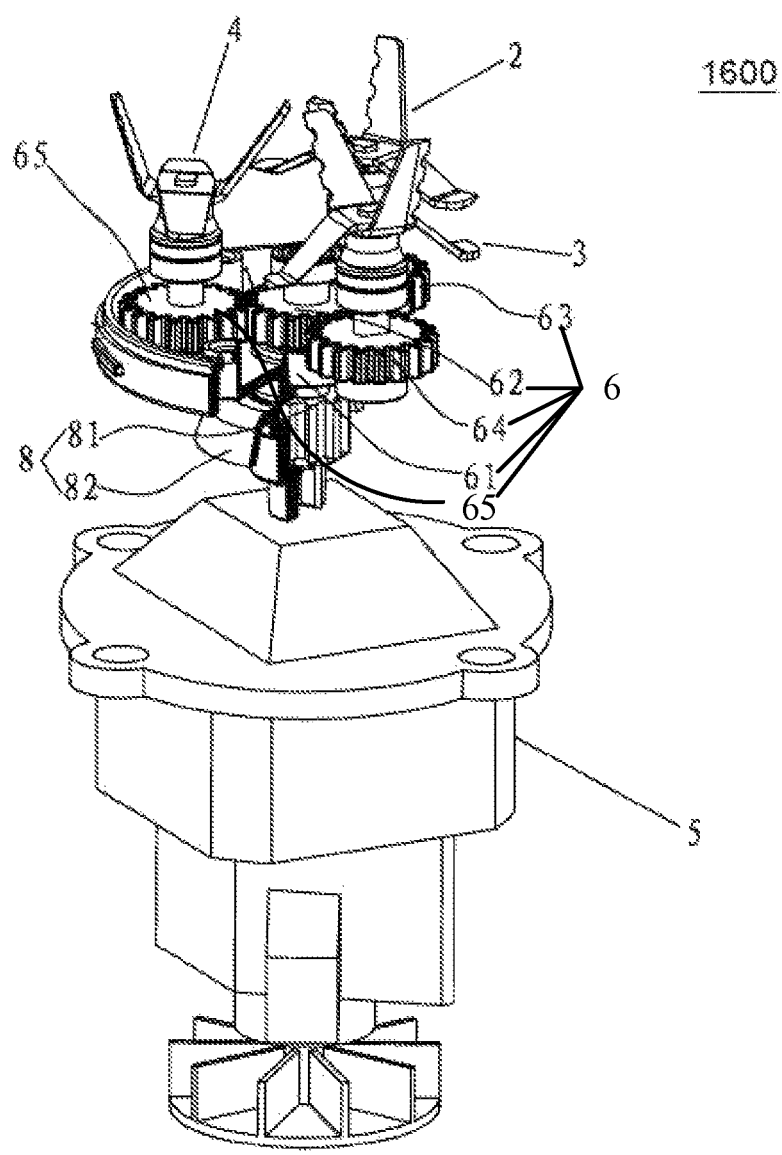
Figure 17:
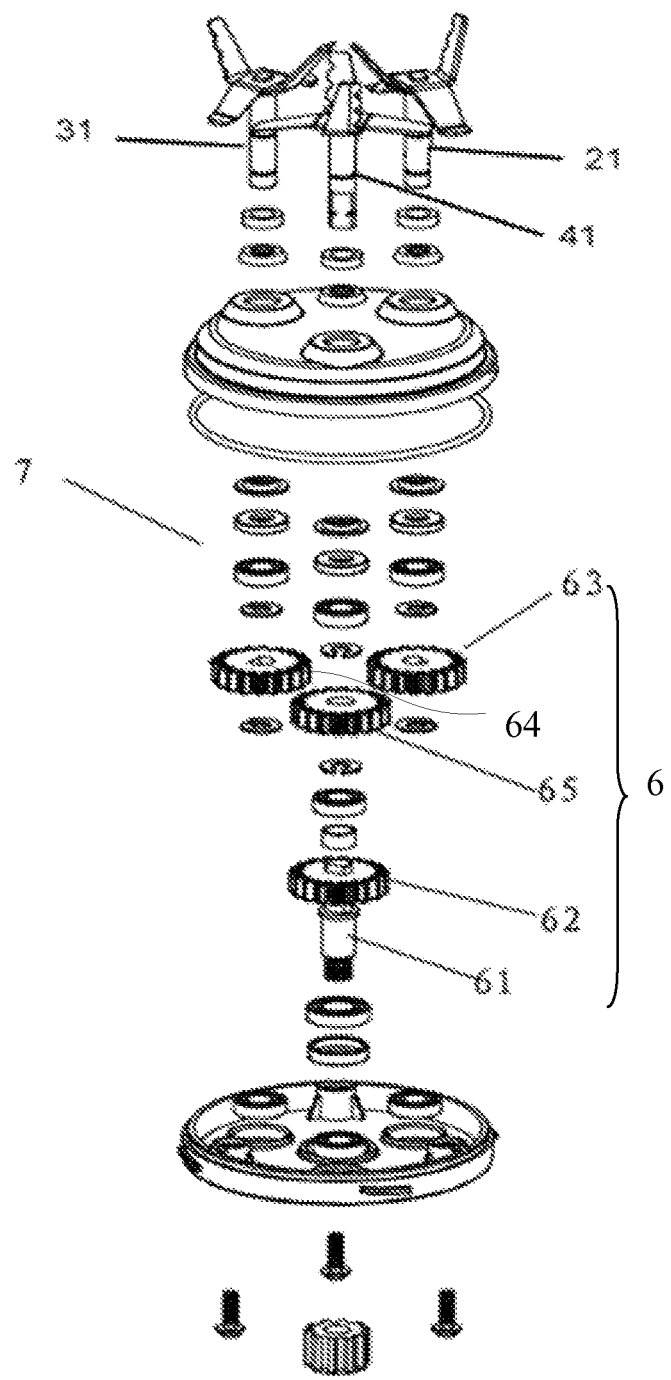
Figure 18:
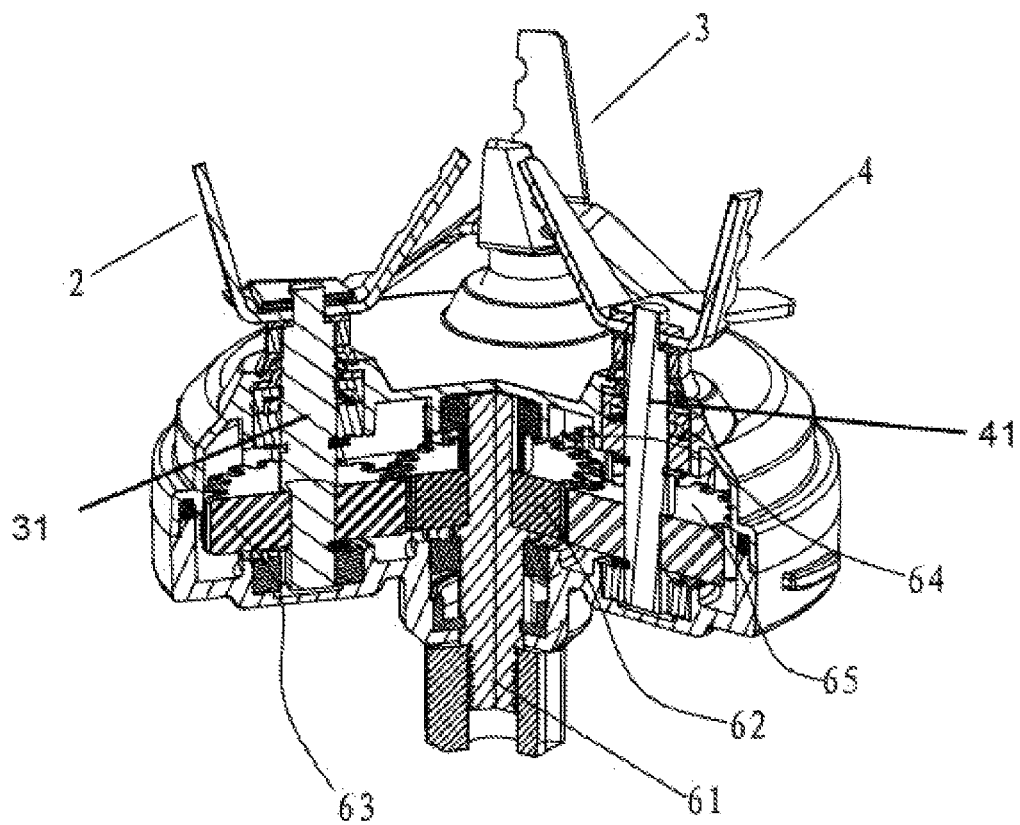
Figure 19:
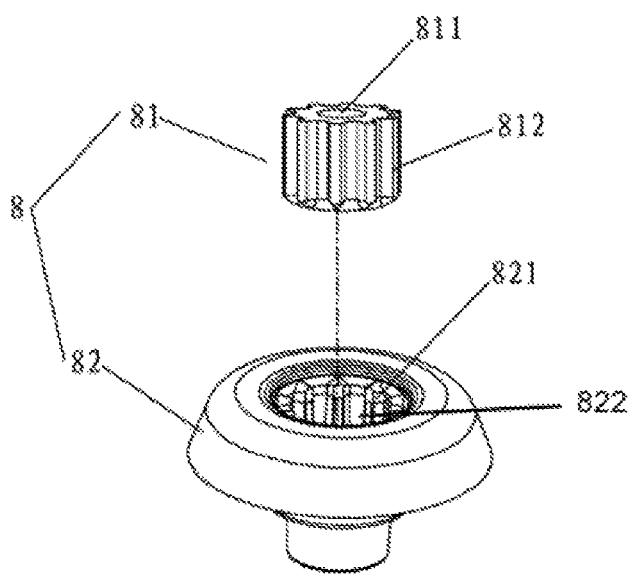

Having thus described the example embodiments of the present invention in general terms, reference will now be made to the accompanying drawings, which are not necessarily drawn to scale, and wherein:

FIG. 1 is a three-dimensional view of a stirring blade group structure according to one example embodiment of the present invention;

FIG. 2 is a three-dimensional view of a first stirring blade group according to one example embodiment of the present invention;

FIG. 3 is a three-dimensional view of a lower stirring blade in the first stirring blade group according to one example embodiment of the present invention;

FIG. 4 is a side view of the lower stirring blade of FIG. 3;

FIG. 5 is a three-dimensional view of an upper stirring blade in the first stirring blade group lower stirring blade;

FIG. 6 is a side view of the upper stirring blade of FIG. 5;

FIG. 7 is a top view of the upper stirring blade of FIG. 5;

FIG. 8 is a three-dimensional view of a second stirring blade group according to one example embodiment of the present invention;

FIG. 9 is a three-dimensional view of a lower stirring blade in the second stirring blade group according to one example embodiment of the present invention;

FIG. 10 is a side view of FIG. 9;

FIG. 11 is a top view of FIG. 9;

FIG. 12 is a three-dimensional view of a third stirring blade group according to one example embodiment of the present invention;

FIG. 13 is a three-dimensional view of a lower stirring blade in the third stirring blade group according to one example embodiment of the present invention;

FIG. 14 is a side view of FIG. 13;

FIG. 15 is a top view of FIG. 13;

FIG. 16 is a three-dimensional view of a stirring device according to one example embodiment of the present invention;

FIG. 17 is a three-dimensional exploded view of the stirring device of FIG. 1;

FIG. 18 is a schematic diagram of a transmission assembly and the stirring blade group structure according to one example embodiment of the present invention; and FIG. 19 illustrates a clutch according to one example embodiment of the present invention.

DETAILED DESCRIPTION OF THE EMBODIMENTS

The present disclosure now will be described more fully with reference to the accompanying drawings, in which some, but not all embodiments of the disclosure are shown. This disclosure may be embodied in many different forms and should not be construed as limited to the embodiments set forth; rather, these example embodiments are provided so that this disclosure will be thorough and complete, and will fully convey the scope of the disclosure to those skilled in the art. Like numbers refer to like elements throughout.

A stirring blade group structure 100 may comprise a stirring blade base 1 and at least three groups of stirring blades. The at least three groups of stirring blades are assembled to the stirring blade base 1. In the example embodiment illustrated in FIG. 1, there are three groups of stirring blades, i.e., a first stirring blade group 2, a second group 3 and a third group 4. Structures of each stirring blade are illustrated in detail from FIGS. 2-14.

FIG. 2 illustrates a three-dimensional view of the first stirring blade group 2. The first stirring blade group 2 may include a stirring shaft 21, a lower stirring blade 22 and an upper stirring blade 23.

Referring to FIG. 3, the lower stirring blade 22 is rotationally symmetrical to its central point. The lower stirring blade 22 includes a central segment 221, two stirring (cutting) segments 222, 223 and two end segments 224, 225. One end of each of the two stirring (cutting) segments 222, 223 connects to one side of the central segment 221. Each of the two end segments 224, 225 connects to the other end of each of the two stirring (cutting) segments 222, 223. A mounting hole 2211 is formed in central portion of the central segment 221. The mounting hole 2211 may be used to attach the lower stirring blade 22 to the stirring shaft 21 (numbered in FIG. 2). Each of the two stirring (cutting) segments 222 and 223 has one side blade. For instance, the stirring (cutting) segment 222 includes a side blade 2221. The stirring (cutting) segment 223 includes a side blade 2231. The side blade 2221 and the side blade 2231 are formed on opposite sides of the lower stirring blade 22. Each of the two end segments 224 and 225 includes one end blade. In this embodiment, the end segment 224 includes an end blade 2241. The end segment 225 includes an end blade 2251. The end blades 2241 and 2251 are on opposite sides of the lower stirring blade 22. The side blade 2221 and the end blade 2241 are on one side of the lower stirring blade 22. The side blade 2231 and the end blade 2251 are on the other side of the lower stirring blade 22.

As shown in FIG. 4, lines going through the two stirring (cutting) segments 222, 223 may form a first stirring segment angle $\theta_{1SS}$. The first stirring segment $\theta_{1SS}$ may vary between 115°-125°. In this embodiment, the first stirring segment angle $\theta_{1SS}$ is around 120°. Lines going through the end segment 224 and the stirring (cutting) segment 222 may form a first end-stirring segment angle $\theta_{1ES}$. It may vary between 145°-155°. In this embodiment, the first end-stirring segment angle $\theta_{1ES}$ is around 150°. Lines going through the end segment 225 and the stirring (cutting) segment 223 may form a second end-stirring segment angle $\theta_{2ES}$. The second end-stirring segment angle $\theta_{2ES}$ may have similar range as the first end-stirring segment angle $\theta_{1ES}$. As the lower stirring blade 22 is rotationally symmetrical to its central point and its cutting edges are on opposite sides, it may be easier to cut and stir food at various places in the container. Each group of the stirring blades will be less or hardly affected by other groups of the stirring blades.

FIGS. 5, 6 and 7 illustrate different views of the upper stirring blade 23. Referring to FIG. 5, the upper stirring blade 23 is U-shaped and includes a central segment 231 connecting two stirring (cutting) segments 232, 233. A central hole 2311 is formed on central portion of the central segment 231. The mounting hole 2311 is used to attach the upper stirring blade 23 to the stirring shaft 21 (numbered in FIG. 2). Similar to the lower stirring blade 22, each of the stirring (cuffing) segments 232, 233 may include a side blade 2321, 2331 (numbered in FIG. 7). The side blade 2321 and the side blade 2331 are formed on opposite sides of the upper stirring blade 23. The side blades 2321, 2331 are discontinuous due to spaces 2322 and 2332 (numbered in FIG. 7) formed on respective side blade.

Referring to FIG. 6, a first upper blade angle $\theta_{1U}$ is formed between a line going through the stirring (cuffing) segment 232 and a line A-A perpendicular to the central segment 231 may vary between 14°-18°. In this embodiment, it may be around 16°. A second upper blade angle $\theta_{2U}$ between the stirring (cuffing) segment 233 and the line A-A may vary between 30°-40°. In this embodiment, it may be around 35°. The two stirring (cuffing) segments 232, 233 are designed to have different angles relative to the line A-A that allows them to cut food at various places in the container, thus eliminating dead angles when the blender is in operation.

Referring back to FIG. 2, when the lower stirring blade 22 and the upper stirring blade 23 are assembled to the stirring shaft 21, the lower stirring blade 22 and the upper stirring blade 23 cross each other to allow the central hole of the lower stirring blade 22 to overlap the central hole of the upper stirring blade 23. The lower stirring blade 22 and the upper stirring blade 23 are attached to one end of the stirring shaft 21 by directing a snapper through the central holes of the lower stirring blade 22 and the upper stirring blade 23 into place at one end of the stirring shaft 21.

FIG. 8 illustrates a three-dimensional view of the second stirring blade group 3 according to an example embodiment. Similar to the first stirring blade group 2, the second stirring blade group 3 includes a stirring shaft 31, a lower stirring blade 32 and an upper stirring blade 33. The lower stirring blade 32 and the upper stirring blade 33 are assembled to the stirring shaft 31 in a similar way that the lower stirring blade 22 and the upper stirring blade 23 are assembled to the stirring shaft 21.

FIGS. 9, 10 and 11 illustrate different views of the lower stirring blade 32. Referring to FIG. 9, the lower stirring blade 32 is rotationally symmetrical to its central point. The lower stirring blade 32 includes a central segment 321, two stirring (cutting) segments 322, 323 and two end segments 324, 325. One end of each of the two stirring (cutting) segments 322, 323 connects to one side of the central segment 321. Each of the two end segments 324 and 325 connects to the other end of each of the two stirring (cutting) segments 322, 323. A mounting hole 3211 is formed in central portion of the central segment 321. Each of the two stirring (cutting) segments 322, 323 has a side blade 3221, 3231 on opposite sides of the lower stirring blade 32. Each of the two end segments 324, 325 includes an end blade 3241, 3251 (numbered in FIG. 11) on opposite sides of the lower stirring blade 32. The side blade 3221 and end blade 3241 are on one side of the lower stirring blade 32. The side blade 3231 and end blade 3251 are on the other side of the lower stirring blade 32.

As shown in FIG. 10, lines going through the two stirring (cutting) segments 322, 323 may form a second stirring segment angle $\theta_{2SS}$. It may vary between 90°-110°. In this embodiment, the second stirring segment angle $\theta_{2SS}$ is around 100°. Lines going through the end segment 324 and the stirring (cutting) segment 322 may form a third end-stirring segment angle $\theta_{3ES}$. It may vary between 130°-150°. In this embodiment, the third end-stirring segment angle $\theta_{3ES}$ is around 140°. Lines going through the end segment 325 and the stirring (cutting) segment 323 may form a fourth end-stirring segment angle $\theta_{4ES}$. The fourth end-stirring segment angle $\theta_{4ES}$ may have similar range as the third end-stirring segment angle $\theta_{3ES}$. The lower stirring blade 32 is rotationally symmetrical to the central point and its cutting edges are on opposite sides.

The upper stirring blade 33 may have similar structure as the upper stirring blade 23 in the first stirring blade group 2 as described above which may not be described in much detail.

FIG. 12 illustrates a three-dimensional view of the third stirring blade group 4 according to an example embodiment. Similar to the first stirring blade group 2 and the second stirring blade group 3, the third stirring blade group 4 includes a stirring shaft 41, a lower stirring blade 42 and an upper stirring blade 43. The lower stirring blade 42 and the upper stirring blade 43 are assembled to the stirring shaft 41 in a similar way that the lower stirring blade 22 and the upper stirring blade 23 are assembled to the stirring shaft 21.

FIGS. 13-15 illustrate different views of the lower stirring blade 42. Referring to FIG. 13, the lower stirring blade 42 is rotationally symmetrical to its central point and includes a central segment 421 and two stirring (cutting) segments 422, 423. Each of the two stirring (cutting) segments 422, 423 connects to one side of the central segment 421. A mounting hole 4211 is formed in central portion of the central segment 421 used for snapping the lower stirring blade 42 into the place at one end of the stirring shaft 41. Each of the two stirring (cutting) segments (422, 423) has a side blade (4221, 4231) on opposite sides of the lower stirring blade 42.

As shown in FIG. 14, lines going through the two stirring (cutting) segments 422, 423 may form a third stirring segment angle $\theta_{3,SS}$. It may vary between 150°-170°. In this embodiment, the third stirring segment angle $\theta_{3,SS}$ is around 160°. The lower stirring blade 42 is rotationally symmetrical to the central point and its cutting edges are on opposite sides.

The upper stirring blade 43 may have similar structure as the upper stirring blade 23 in the first stirring blade group 2 and the upper stirring blade 33 of the second stirring blade group 3 as described above which may not be described in much detail.

FIG. 16 is a three-dimensional view of a stirring device 1600 according to one example embodiment of the present invention. The stirring device 1600 may include a drive unit 5, a transmission assembly 6, a stirring blade group structure (the stirring blade group structure 100 illustrated in FIG. 1) and a clutch 8. The transmission assembly 6 may include a transmission shaft 61, a driving gear 62, driven gears 63, 64 and 65. Assembly and operation of the transmission assembly 6 will be described in detail in describing FIGS. 17 and 18. The clutch 8 includes a connecting gear 81 and a clutch base 82. Assembly and operation of the clutch 8 will be described in detail in describing FIG. 19. The drive unit 5, such as a motor, may drive the first, second and third stirring blade groups 2, 3 and 4 to rotate by means of the transmission assembly 6.

FIG. 17 is a three-dimensional exploded view of the stirring device of FIG. 1. As described above in FIG. 16, the transmission assembly 6 may include the transmission shaft 61, the driving gear 62 and three driven gears 63, 64 and 65. The driving gear 62 is attached to the transmission shaft 61. The driven gears 63, 64 and 65 may be attached to the stirring shaft 21, 31 and 41, respectively. The stirring blade group structure (not numbered) may also comprise three groups of seal assemblies 7 associated with three stirring shafts 21, 31 and 41, respectively. Each group of seal assemblies surround and are concentric with one of the stirring shafts 21, 31 and 41.

With reference to FIG. 18, each driven gear (63, 64, 65) is attached to a respective stirring shaft (21, 31, 41). The driving gear 62 engages with each of the driven gears 63, 64 and 65. There are may be any number of idler gears successively connected to transmit power from the driving gear 62 to each of the driven gears 63, 64 and 65. The driving gear 62 is attached to the transmission shaft 61.

In operation, with references to FIGS. 16-18, when the drive unit 5 drives the transmission shaft 61 to rotate, the transmission shaft 61 transmits the power to the driving gear 62. The driving gear 62 then drives the driven gears 63, 64 and 65 by engagement thus driving the stirring shafts 21, 31 and 41. The stirring shaft 21, 31, 41 then drive their corresponding stirring blades (not numbered) to rotate to cut and stir food in the container.

As described above, a stirring blade group structure may also comprise a clutch to transmit power from the drive unit to the stirring blades. FIG. 19 illustrates the clutch 8 according to one example embodiment of the present invention. The clutch 8 may provide a smooth transfer of power and torque to engage and disengage the power flow from the drive unit (not numbered) to the transmission shaft (not numbered). As described above in FIG. 16, the clutch 8 includes the connecting gear 81 and the clutch base 82. Referring to FIG. 19, the clutch base 82 has an opening 822 to receive the connecting gear 81. The opening 822 has an interior wall on which an internal gear 821 is formed. The connecting gear 81 has an exterior wall on which an exterior gear 812 may be formed. When the connecting gear 81 is assembled to the clutch base 82, the connecting gear 81 slides into the opening 822 to allow the exterior gear 812 to engage with the interior gear 821. The connecting gear 81 may also have a central aperture 811 through which the transmission shaft extends. The central aperture 811 may be concentric with the transmission shaft.

Referring back to FIG. 16, in operation, the clutch 8 connects the drive unit 5 to the transmission shaft 61. The transmission shaft 61 rotates and transmits the power from the drive unit 5 to the driving gear 62. The driving gear 62 then drives the driven gears 63, 64 and 65 by engagement.

In various applications, the number of the stirring blade groups may not be limited to three. The stirring shaft of each stirring blade group may be perpendicular to surface of the stirring base or alternatively have an angle less or larger than 90° relative to the surface of the stirring base.

The aforementioned embodiment is the preferred embodiment of the present utility model invention and the scope is not limited to this. All changes and modifications made by those skilled in the related art are deemed to be within the applied scope of the utility model invention. Thereby the protection scope of the utility model invention shall be based on those described in the claims.

The invention claimed is:

1. A stirring blade group structure, comprising:
   a stirring blade base; and
   at least three groups of stirring blades attached to the stirring blade base, each stirring blade group including:
   a stirring shaft;
   a lower stirring blade having a lower hole formed on the lower stirring blade through which the stirring shaft extends, each lower stirring blade including a first lower stirring segment and a second lower stirring segment symmetrically to each other with respect to a centerline of the stirring shaft, a line going through the first stirring segment and a line going through the second lower stirring segment forming a lower bending angle, wherein the lower bending angle of the lower stirring blade in one group is different than that of the lower stirring blade in any of another two groups, wherein the lower stirring blade in the one group further includes a first end segment extending from the first lower stirring segment and a second end segment extending from the second lower stirring segment, a line going through the first end segment and the first lower stirring segment forming an end-stirring segment angle, a line going through the second end segment and the second lower stirring segment forming the end-stirring segment angle,
   wherein the end-stirring segment angle of the lower stirring blade in the one group is different than that of the lower stirring blade in at least one of the another two groups; and
   an upper stirring blade having an upper hole formed on the upper stirring blade through which the stirring shaft extends, the upper stirring blade including a first upper stirring segment and a second upper stirring segment asymmetrically to each other with respect to the centerline of the stirring shaft, a line going through the first stirring segment and a line going through the stirring shaft forming a first upper stirring angle, a line going through the second stirring segment and the line going through the stirring shaft forming a second upper stirring angle, wherein the first upper stirring angle is different than the second upper stirring angle, and wherein the first upper stirring segment and the second upper stirring segment form a U-shape.

2. The stirring blade group structure of claim 1, wherein each stirring shaft is perpendicular to a surface of the stirring blade base, and wherein the at least three groups of stirring blades are laterally positioned relative to the stirring blade base.

3. The stirring blade group structure of claim 1, wherein the first lower stirring segment further comprises a first lower side blade and the second lower stirring segment further comprises a second lower side blade, wherein the first lower side blade and the second lower side blade are in a direction in which the lower stirring blade rotates.

4. The stirring blade group structure of claim 1, wherein each of the first end segment and the second end segment further comprises an end blade, wherein each end blade is in a direction in which the lower stirring blade rotates.

5. The stirring blade group structure of claim 1, wherein the lower bending angle in a first stirring blade group is between 115°-125°, the bending angle in a second stirring blade group is between 90°-110°, and the bending angle in a third stirring blade group is between 150°-170°.

6. The stirring blade group structure of claim 1, wherein the first upper stirring segment comprises a first upper side blade and the second upper stirring segment comprises a second upper side blade, and wherein the first upper side blade and the second upper side blade is in a direction in which the upper stirring blade rotates.

7. The stirring blade group structure of claim 1, wherein the first upper stirring segment comprises first adjacent side blades are separated by spaces and the second upper stirring segment comprises second adjacent side blades separated by spaces.

8. The stirring blade group structure of claim 1, wherein the first upper stirring angle is between 14°-18°, and wherein the second upper stirring angle is between 30°-40°.

9. A stirring device, comprising:
a drive unit, a transmission assembly coupled to the drive unit and a stirring blade group structure coupled to the transmission assembly, the transmission assembly configured to transmit power from the drive unit to the stirring blade group structure, the stirring blade group structure including:
a stirring blade base; and
at least three groups of stirring blades, each stirring blade group including:
a stirring shaft;
a lower stirring blade having a lower hole formed on the lower stirring blade through which the stirring shaft extends, each lower stirring blade including a first lower stirring segment and a second lower stirring segment symmetrically to each other with respect to a centerline of the stirring shaft, a line going through the first stirring segment and a line going through the second lower stirring segment forming a bending angle, wherein the lower bending angle of the lower stirring blade in one group is different than that of the lower stirring blade in any of another two groups, wherein the lower stirring blade in the one group further includes a first end segment extending from the first lower stirring segment and a second end segment extending from the second lower stirring segment, a line going through the first end segment and the first lower stirring segment forming an end-stirring segment angle, a line going through the second end segment and the second lower stirring segment forming the end-stirring segment angle, wherein the end-stirring segment angle of the lower stirring blade in the one group is different than that of the lower stirring blade in at least one of the another two groups; and
an upper stirring blade having an upper hole formed on the upper stirring blade through which the stirring shaft extends, the upper stirring blade including a first upper stirring segment and a second upper stirring segment asymmetrically to each other with respect to the centerline of the stirring shaft, a line going through the first stirring segment and a line going through the stirring shaft forming a first upper angle, a line going through the second stirring segment and the line going through the stirring shaft forming a second upper angle, wherein the first upper angle is different than the second upper angle, and wherein the first upper stirring blade and the second upper stirring segment form a U-shape.

10. The stirring device of claim 9, the transmission assembly comprises a transmission shaft, a driving gear coupled to the transmission shaft and at least three driven gears, each driven gear being attached to one stirring shaft of the at least three groups of stirring blades, wherein the transmission shaft transmits power from the drive unit to the driving gear and the driving gear drives the driven gears by engagement to enable the stirring shafts to rotate.

11. The stirring device of claim 9, wherein central line of each stirring shaft of the at least three stirring blade groups is parallel with central line of the transmission shaft.

12. The stirring device of claim 9, further comprises three groups of seal assemblies associated with the groups of stirring blades, each of the seal assemblies surround and are concentric with one of the three stirring shafts.

13. The stirring device of claim 9, further comprises a clutch, wherein the clutch configured to provide a transfer of power and torque to engage and disengage the power flow from the drive unit to the transmission shaft.

14. The stirring device of claim 9, wherein the first lower stirring segment further comprises a first lower side blade and the second lower stirring segment further comprises a second lower side blade, wherein the first lower side blade and the second lower side blade are in a direction in which the lower stirring blade rotates.

15. The stirring device of claim 9, wherein each of the first end segment and the second end segment further comprises an end blade, wherein each end blade is in a direction in which the lower stirring blade rotates.

16. The stirring device of claim 9, wherein the lower bending angle in a first stirring blade group is between 115°-125°, the lower bending angle in a second stirring blade group is between 90°-110°, and the lower bending angle in a third stirring blade group is between 150°-170°.

17. The stirring device of claim 9, wherein the first upper stirring segment comprises first adjacent side blades are separated by spaces and the second upper stirring segment comprises second adjacent side blades separated by spaces.

18. The stirring device of claim 9, wherein the first upper stirring segment comprises a first upper side blade and the second upper stirring segment comprises a second upper side blade, and wherein the first upper side blade and the second upper side blade is in a direction in which the upper stirring blade rotates.

19. The stirring device of claim 9, wherein the first upper stirring angle is between 14°-18°, and wherein the second upper stirring angle is between 30°-40°.

* * * * *